US007239604B2

(12) United States Patent
Kim et al.

(10) Patent No.: US 7,239,604 B2
(45) Date of Patent: Jul. 3, 2007

(54) OVSF CODE SYSTEM AND METHODS FOR CDMA STATIONS

(75) Inventors: Younglok Kim, Seoul (KR); Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 326 days.

(21) Appl. No.: 10/831,254

(22) Filed: Apr. 23, 2004

(65) Prior Publication Data

US 2004/0196781 A1 Oct. 7, 2004

Related U.S. Application Data

(63) Continuation of application No. 10/419,485, filed on Apr. 21, 2003, now Pat. No. 6,747,947, which is a continuation-in-part of application No. 10/040,513, filed on Dec. 28, 2001, now Pat. No. 6,552,996.

(60) Provisional application No. 60/323,120, filed on Sep. 18, 2001.

(51) Int. Cl.
*H04B 7/216* (2006.01)
*H04J 13/00* (2006.01)

(52) U.S. Cl. ...................... 370/209; 370/335; 370/342; 375/140

(58) Field of Classification Search ................ 370/203, 370/206, 208, 209, 335, 342; 375/130, 140
See application file for complete search history.

(56) References Cited

U.S. PATENT DOCUMENTS 5,442,627 A * 8/1995 Viterbi et al. ............... 370/209
5,751,761 A 5/1998 Gilhousen
6,009,091 A 12/1999 Stewart et al.
6,091,757 A 7/2000 Cudak et al.
6,163,524 A 12/2000 Mognusson et al.
6,222,875 B1 4/2001 Dahlman et al.
6,233,231 B1 5/2001 Felix et al.
6,330,291 B1 * 12/2001 Agrawal et al. ............ 375/326
6,400,755 B1 6/2002 Harris et al.
6,466,142 B1 * 10/2002 Barbano ...................... 341/50

(Continued)

FOREIGN PATENT DOCUMENTS

WO 99/03224 1/1999

(Continued)

OTHER PUBLICATIONS

F. Adachi et al., "Tree Structured Generation of Orthogonal Spreading Codes with Different Length for Foward Link of DS-CDMA Mobile Radio", Electronics Letters, vol. 33, No. 1, Jan. 1997.

(Continued)

*Primary Examiner*—Alpus H. Hsu
(74) *Attorney, Agent, or Firm*—Volpe and Koenig, P.C.

(57) ABSTRACT

A code indexing system for a CDMA communication station that uses orthogonal variable spreading factor (OVSF) codes has a single number mapped to each code. The new code number itself not only provides the code signature, but it is also used for the OVSF code generation. In addition, the system provides easy and fast generation of the available code list without the help of look-up table. This capability improves the dynamic code assignment.

18 Claims, 4 Drawing Sheets

U.S. PATENT DOCUMENTS

| | | | | |
|---|---|---|---|---|
| 6,483,828 | B1 * | 11/2002 | Balachandran et al. | 370/342 |
| 6,532,250 | B1 * | 3/2003 | Palenius et al. | 375/141 |
| 6,693,952 | B1 * | 2/2004 | Chuah et al. | 375/140 |
| 6,813,258 | B2 * | 11/2004 | Hans et al. | 370/335 |
| 6,813,506 | B1 * | 11/2004 | Song | 455/466 |
| 6,885,691 | B1 * | 4/2005 | Lyu | 375/130 |
| 6,956,890 | B2 * | 10/2005 | Lattuca et al. | 375/140 |
| 6,982,946 | B2 * | 1/2006 | Wiberg et al. | 370/208 |
| 7,012,886 | B2 * | 3/2006 | Meier et al. | 370/209 |
| 2002/0018457 | A1 * | 2/2002 | Choi et al. | 370/342 |

FOREIGN PATENT DOCUMENTS

| | | |
|---|---|---|
| WO | 00/042723 | 7/2000 |
| WO | 01/056162 | 8/2001 |
| WO | 01/58070 | 8/2001 |

OTHER PUBLICATIONS

E.H. Dinan et al., "Spreading Codes for Direct Sequence CDMA and Wideband CDMA Cellular Networks", IEEE Communication Magazine, Sep. 1998.

P. Godlewski et al., "Orthogonal Variable Rate Spreading Sequences With Improved Correlation Properties for Wireless CDMA Cellular Networks", Vehicular Technology Conference, May 1999.

R.G. Cheng et al. "OVSF Code Channel Assignment for IMT-2000", Vehicular Technology Conference, Spring 2000.

T. Minn et al., "Dynamic Assignment of Orthogonal Variable Spreading Factor Codes in W-CDMA", IEEE Journal on Selected Areas in Communication, vol. 18, No. 8, Aug. 2000.

Lee J. S. , Generation of Walsh Functions as Binary Group Coeds, UMI Article Clearinghouse, Ann Arbor, US, pp. 58-61, Mar. 1970-03.

* cited by examiner

| Layer Number | SF/Code number | INDEX P New code label in binary (a0,a1,...) | New code label in decimal | OVSF code word (-1 is substituted with 0) |
|---|---|---|---|---|
| 0 | 1/0 | 1 | 1 | 1 |
| 1 | 2/0 | 10 | 2 | 11 |
| 1 | 2/1 | 11 | 3 | 10 |
| 2 | 4/0 | 100 | 4 | 1111 |
| 2 | 4/1 | 101 | 5 | 1100 |
| 2 | 4/2 | 110 | 6 | 1010 |
| 2 | 4/3 | 111 | 7 | 1001 |
| 3 | 8/0 | 1000 | 8 | 11111111 |
| 3 | 8/1 | 1001 | 9 | 11110000 |
| 3 | 8/2 | 1010 | 10 | 11001100 |
| 3 | 8/3 | 1011 | 11 | 11000011 |
| 3 | 8/4 | 1100 | 12 | 10101010 |
| 3 | 8/5 | 1101 | 13 | 10100101 |
| 3 | 8/6 | 1110 | 14 | 10011001 |
| 3 | 8/7 | 1111 | 15 | 10010110 |

Figure 2

OVSF CODE SYSTEM AND METHODS FOR CDMA STATIONS

CROSS-REFERENCE TO RELATED APPLICATIONS

This application is a continuation of U.S. patent application Ser. No. 10/419,485, filed Apr. 21, 2003, now U.S. Pat. No. 6,747,947 which is a continuation-in-part of U.S. patent application Ser. No. 10/040,513, filed Dec. 28, 2001, now U.S. Pat. No. 6,552,996 which in turn claims the benefit of U.S. Provisional Patent Application Ser. No. 60/323,120, filed Sep. 18, 2001 which is incorporated by reference.

FIELD OF INVENTION

The present invention relates CDMA communication systems and, in particular, to Orthogonal Variable Spreading Factor (OVSF) codes and methods for allocating, generating and determining orthogonality of OVSF codes of different data rates used in CDMA wireless communication stations.

BACKGROUND

CDMA communication systems are well known in the art. Generally, such systems comprise communication stations which transmit and receive wireless communication signals between each other. Typically, base stations are provided which are capable of conducting wireless concurrent communications with a plurality of subscriber stations. In CDMA systems specified by the Third Generation Partnership Project (3GPP), base stations are called Node Bs, subscriber stations are called User Equipments (UEs) and the wireless interface between the Node Bs and UEs is known as the Uu interface. FIG. 3 illustrates a typical 3GPP CDMA system.

Orthogonal variable spreading factor (OVSF) codes provide an orthogonal code set of variable spreading factors. In the prior art, methods exist for allocating a set of OVSF codes of different data rates employing Walsh codes of variable length. The code assignment is made on the basis of channel data rates in a manner that results in improved utilization of the available frequency spectrum.

An alternative method to obtain OVSF codes based on the code tree structure is based on the modified Hadamard transformation, which requires two indices to indicate a specific code, (i.e., spreading factor and code number). In order to handle the code allocation process, an ASSIGNED list and a BUSY list are conventionally generated.

These prior art methods have drawbacks in that they require a large amount of memory to store a large number of codes, or require fast processing speeds to generate the codes or effectively allocate the available codes.

SUMMARY

Communication stations for a CDMA system include a code indexing system and method for orthogonal variable spreading factor (OVSF) codes that introduces a single number mapped to each code. The new code number itself not only provides the code signature, but it is also used for the OVSF code generation. In addition, it provides easy and fast generation of the available code list without the help of a look-up table. This capability improves the dynamic code assignment.

In general, each communication station is configured with a processor and an associated memory device so that OVSF codes are selected from a set of Walsh codes by using an index value p where p represents the $(p+1)-2^i$th Walsh code of the ith layer of Walsh codes where i is an integer such that $2^i \leqq p < 2^{i+1}$. Accordingly the memory device includes an index P for the code values p. Preferably, the OVSF code is selected on the basis of a spreading factor SF which is a power of 2 and a Walsh code is selected having an associated index p where $SF \leqq p < 2SF$.

The relative orthogonality of a selected Walsh code of layer i represented by index value p with another Walsh code of layer j represented by an index value q is determined by comparing the binary forms of p and q. The binary form of p is a sequence of i significant binary digits and the binary form of q is a sequence of j significant binary digits. The represented Walsh codes are determined to be not orthogonal if either the binary form of p is the same as the i most significant binary digits of the binary form of q or the binary form of q is the same as the j most significant binary digits of the binary form of p.

A selected Walsh code represented by index value p is easily generated based upon the sequence of significant binary digits representing the binary form of p. Accordingly, the binary form of p is preferably the index P value stored in the memory device of the communication station. The selected Walsh code is generated as the Kronecker Product of i Walsh codes represented by index values 2 and 3 correspondingly to the sequence of i significant binary digits of the binary form of p where each binary digit 0 corresponds to the Walsh code of index value 2 and each binary digit 1 corresponds to the Walsh code of index value 3.

Alternatively, the selected Walsh code is generated by the Kronecker product of two Walsh codes represented by index values q and r of respective layers of j and k where j+k=i. In such case, the binary form of p is the same as the binary form of q concatenated with the binary forms of $(r-2^k)$. Thus the processor is preferably configured to use the binary form of q concatenated with the binary forms of $(r-2^k)$ as the binary form of p to generate a selected Walsh code.

In general, the processor of the communication station is configured to use and select OVSF codes based upon a spreading factor SF where SF is a positive power of 2, using an index value p from a set of codes where for each integer p>3 the corresponding code is defined by $C(p)=C(m+2) \otimes C(k)$, with $p=2 \cdot k+m$, where k and m are integers with m=0 or 1. The codes corresponding to p=1, 2 or 3 are C(1)=[1], C(2)=[1, 1], and C(3)=[1, −1]. Accordingly, p represents the $(p+1)-2^i$th code of an ith layer of codes for $SF=2^i$ where i is the unique integer such that $2^i \leqq p < 2^{i+1}$.

Other objects and advantages of the invention will be apparent to those skilled in the art from the following description.

BRIEF DESCRIPTION OF THE DRAWING(S)

FIG. 2 is a table representing an indexing system according to the teaching of the present invention.

DETAILED DESCRIPTION OF THE PREFERRED EMBODIMENT(S)

Figure 1:
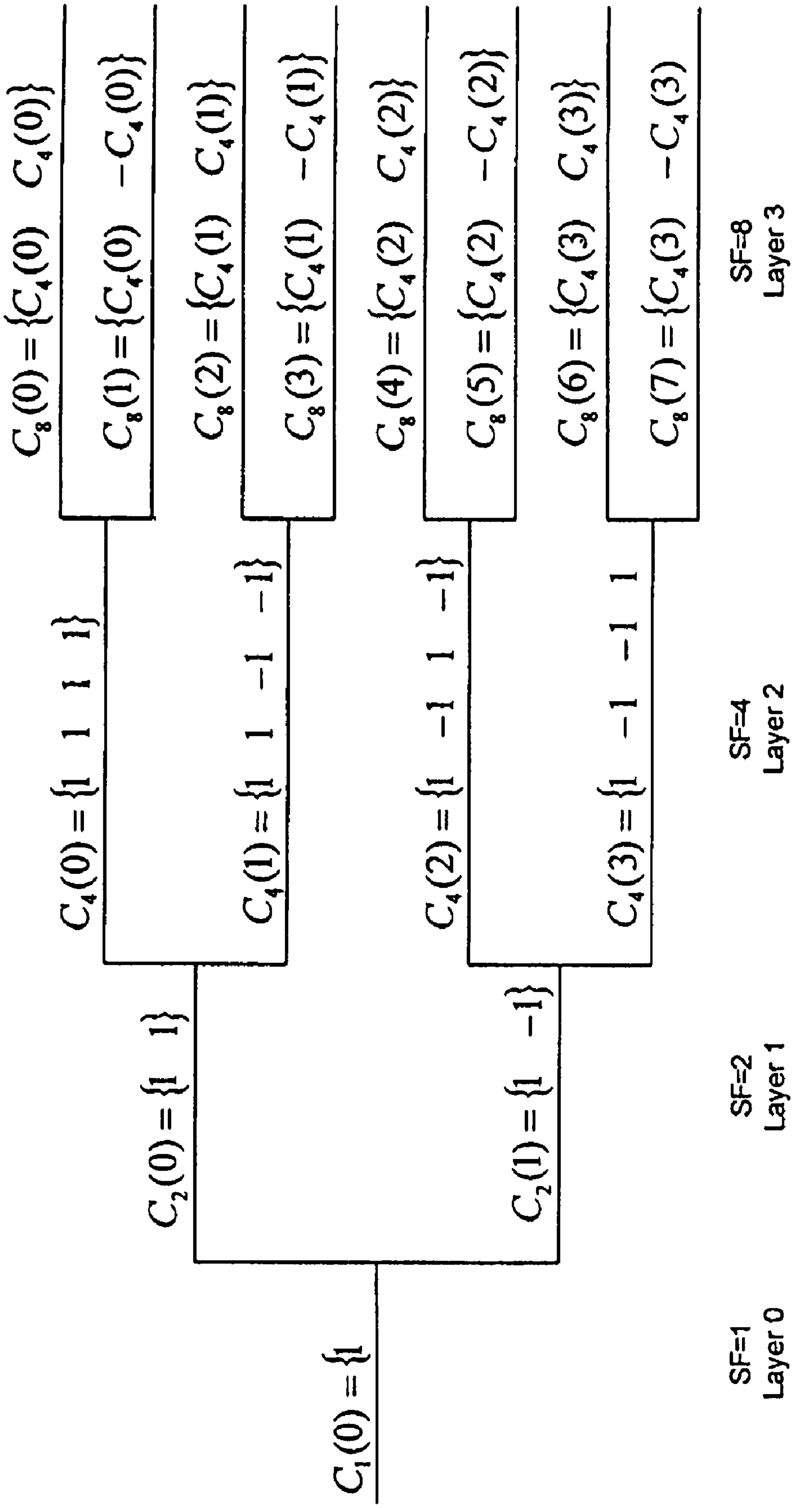
FIG. 1 is a prior art OVSF code tree of Walsh codes.
Figure 3:
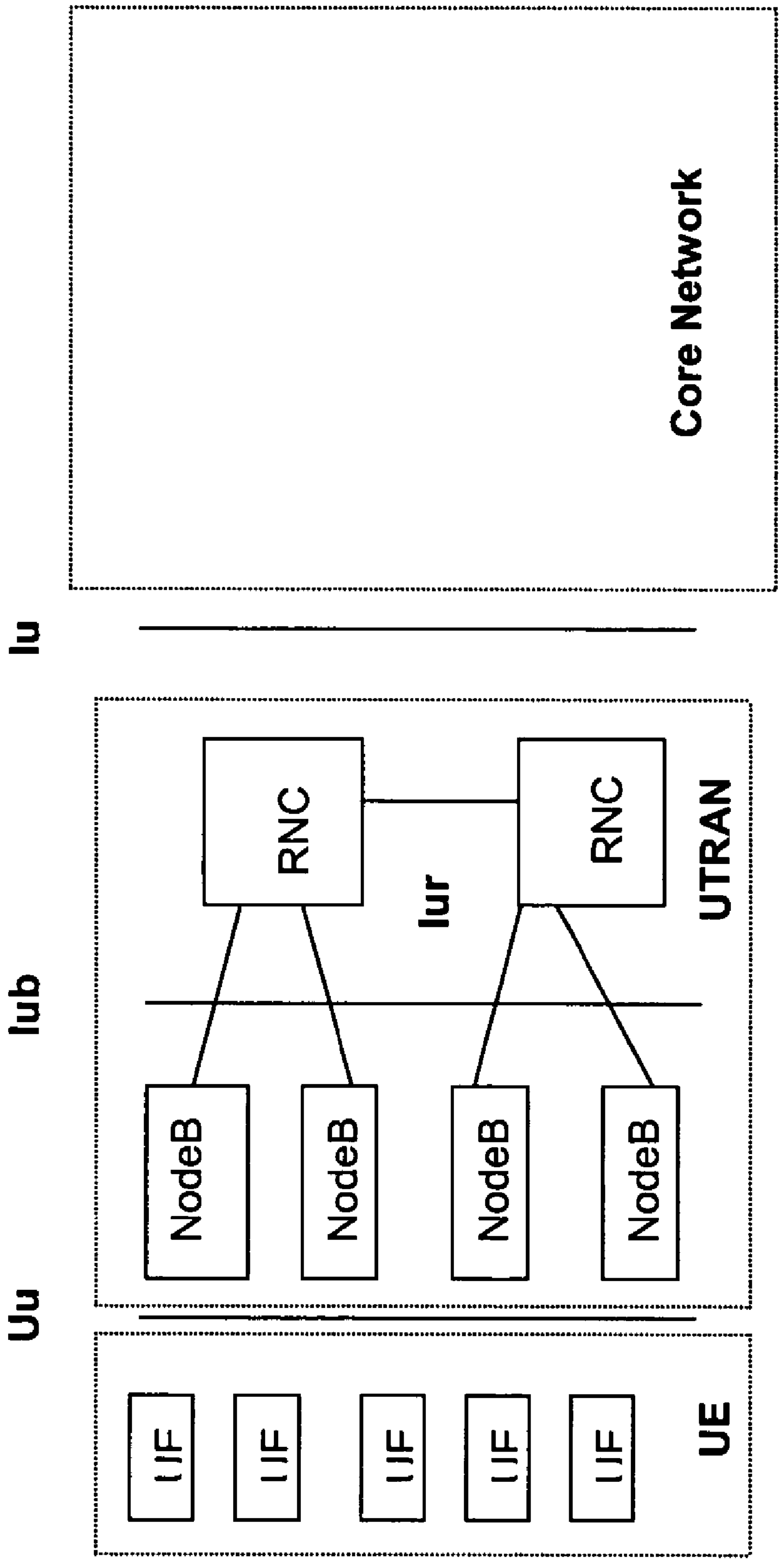
FIG. 3 is a schematic diagram of a typical CDMA system in accordance with current 3GPP specifications.

OVSF codes are used in the encoding and decoding of communication signals between communication stations, such as between Node Bs and UEs of the CDMA system depicted in FIG. 3. A conventional OVSF code tree structure is shown in FIG. 1 which codes are referred to as Walsh codes herein. $C_{SF}(n)$ denotes the OVSF code word with the spreading factor $SF=2^k$, where n is the code number and k is the layer number. The indices n and k are known as the Hadamard indices. The Walsh codes are conventionally generated recursively from the code tree as shown in FIG. 1.

The mother codes are the lower layer codes on the path from the specific code to the root code $C_1(0)$, and the descendent codes are those produced from the specific code. For example, the mother codes of $C_8(2)$ is $C_4(1)$, $C_2(0)$ and $C_1(0)$, and the descendent codes of $C_4(1)$ are $C_8(2)$, $C_8(3)$ and their descendent codes.

Two codes are orthogonal if, and only if, any one is not the mother code or the descendent code of another. When a specific code is assigned, its mother codes and descendent codes cannot be assigned in the same channel since they are not orthogonal to each other. In other words, two OVSF codes with different spreading factors are not orthogonal when they are on the same branch of the code tree.

When a new call is requested with a specific data rate, the communication station needs to assign a code from an available set of codes with the corresponding spreading factor. Conventionally, in order to maintain the orthogonality between assigned codes, the set of available code list is updated whenever the new code is assigned. This code set is updated by removing the assigned code itself and all of its descendent and mother codes.

Figure 4:
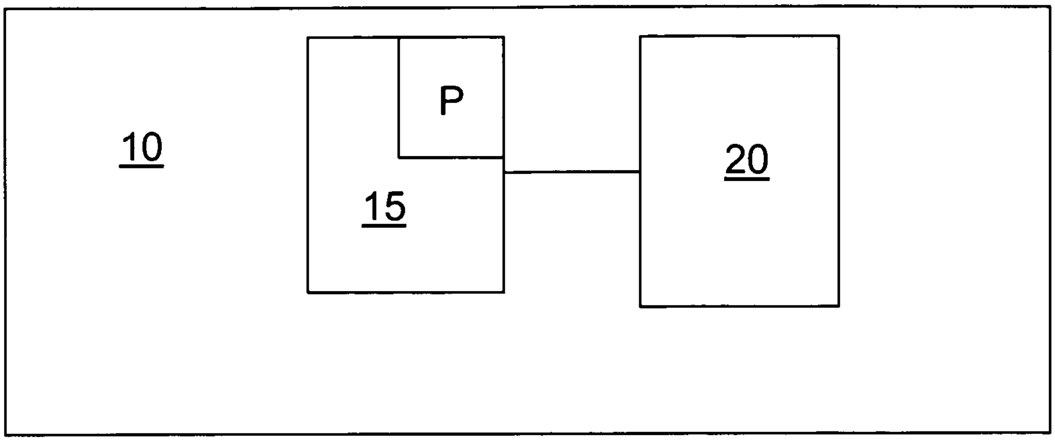
FIG. 4 is block diagram of a communications station made in accordance with the teachings or the present invention.

The inventors have recognized that the prior art codes can each be assigned via a single indice system instead of the dual indice system per the known Hadamard method. In the single indice system of the present invention, a sequential numerical code label p is assigned where p equals the sum of the code layer plus the code number of the conventional tree structure designation using Hadamard indices as refected in step 30 of FIG. 5. As such, the code labels are sequential integers starting with the one code of layer 0 where SF=1 labeled as 1, the two codes of layer 1 where SF=2 labeled as 2 and 3, followed by the $2^i$ codes of layer i where $SF=2^i$ labeled as the next $2^i$ integers for each successive layer i from 2 onward as represented in FIG. 2 for layers 0 through 3. Although only codes for spreading factors up to 8 are shown in FIG. 2, the system is applicable for spreading codes of any power of 2. Accordingly, as illustrated in FIG. 4, a processor 20 within a communication station 10 that selects the OVSF codes has an associated memory device 15 that includes an index P which contains the code label values p.

In general for each positive integer label p, there is a unique integer i, where $2^i \leqq p < 2^{(i+1)}$, and p represents the $(p+1)-2^i$th Walsh code of the ith layer of Walsh codes. For example, when p=87, i=6 since $64 \leqq p < 128$, so that 87 represents the 24th Walsh code of the 6th layer of the Walsh codes. For p=1, i=0 since $2^0 \leqq 1 < 2$, so 1 represents the first code of the zeroth layer. Generally, for a prior art code designated $C_N(x)$, that code is the (x+1)th code of layer N, since the prior art code designations start for each layer with x=0.

In lieu of using the prior art designations of FIG. 1, the prior art tree-structured codes can be generated for each positive integer p by the recursive Kronecker procedure where for each integer p>3 the corresponding code is defined by:

$$C(p)=C(m+2)\otimes C(k), \qquad \text{Equation (1)}$$

with $$p=2\cdot k+m, \qquad \text{Equation (2)}$$

where k and m are integers with m=0 or 1, and the codes corresponding to p=1, 2 or 3 are:

$$C(1)=[1],\ C(2)=[1, 1], \text{ and } C(3)=[1, -1]. \qquad \text{Equation (3)}$$

As noted above, for any specified p there is a unique integer i such that $2^i \leqq p < 2^{i+1}$, so that each p represents a code of only one SF, namely $SF=2^i$. Also, the code represented by p is the $(p+1)-2^i$th code of an ith layer of codes starting with p=1 representing the first code of a zeroth layer.

Codes generated in this manner meet the following three properties:

Property 1: The OVSF code for code label p where $SF \leqq p < 2SF$ and $SF=2^L$ can be factored into a Kronecker product with L+1 terms of C(2) or C(3) as follows:

$$C(p)=C(a_L+2)\otimes \ldots \otimes C(a_1+2)\otimes C(a_0+2) \qquad \text{Equation (4)}$$

where $a_0=1$ and each $a_i$, for i=1 to L, is 0 or 1 and $$p = a_0 \cdot 2^L + a_1 \cdot 2^{L-1} + \ldots + a_L = \sum_{i=0}^{L-1} (a_i \cdot 2^{(L-i)}) \qquad \text{Equation (5)}$$

Thus, $a_0 a_1 \ldots a_L$ is the binary representation of p where $a_0=1$ and each $a_i$, for i>1, is the binary digit 1 or 0.

Property 2: The mother codes of C(p) are all of the form:

$$[C(a_{L-m}+2)\otimes \ldots \otimes C(a_1+2)\otimes C(a_0+2)] \text{ with } m=\ldots L.$$

Property 3: The descendent codes of C(p) are all $C(q)\otimes C(p)$ with any positive integer q.

For notational purposes, code designations of the present invention C(p) where p is in decimal form can also be represented as $c(p_{binary})$, i.e. $c(a_0 \ldots a_{N-1})$ where $a_0 \ldots a_{N-1}$ is the binary representation of p. For example, C(6)=c(110), since 6 in decimal notation equals 110 in binary notation.

The code indexing system implemented in CDMA communication stations in accordance with the present invention is illustrated in FIG. 2 FIG. 4. The OVSF code words with their spreading factor up to 8 are shown with both the conventional index using the Hadamard indices and the new code index representations.

The OVSF code layer numbers are shown in the first column. The conventional OVSF code indices are shown in the second column, i.e., SF and code number. The third and fourth columns are the binary and decimal forms of the code labels of the present invention. Preferably, the binary code label values are stored in an index P of a memory device 15 associated with the communication station's processor 20 that selects and generates the Walsh codes.

The code label index maps a code label to each codeword shown in the last column. The code words of FIG. 2 correspond directly to the Walsh code sets of 1s and −1s in FIG. 1 with 0s in the codeword being substituted for each −1 of the corresponding Walsh code.

In view of properties 2 and 3, the mother codes and descendent codes of c(a0,a1,a2,a3) are {c(a0), c(a0,a1), c(a0,a1,a2)} and all the codes having binary indices starting with (a0,a1,a2,a3), i.e., c(a0,a1,a2,a3,X,X,X, . . . ) are easily identifiable.

The code label indexing method in accordance with the present invention has several distinct advantages over prior art methods:

1) Reduced Number of Bits for Identifying Codes and Increased Capacity

The new indexing method reduces the memory size requirements for the communication stations since only L+1 bits are required to support the maximum spreading factor $2^L$, while the conventional indexing requires $L+\lceil \log_2(L)-1 \rceil$ bits for the same case. For example, there is a 3 bit saving for the maximum spreading factor 512. For maximum spreading factor 512, the conventional method needs 4 bits to store ten spreading factors {1,2,4,8,16,32,64,128,256, 512} or ten layer numbers {0,1,2,3,4,5,6,7,8,9} correspondingly. In addition, the conventional method needs 9 bits to distinguish between the 512 codes in the 10th layer. Accordingly, a total of 13 bits are conventionally required to identify a particular code within a 10 layer system which supports spreading factors up to and including 512. In comparison, the new method needs only 10 bits to distinguish all the codes of 1023 for spreading factors up to and including 512. The reduction of 3 bits from 13 bits represents a nearly 25% increase in capacity.

2) Easy to Generate Available Orthogonal Codes During Code Assignment

Figure 5:
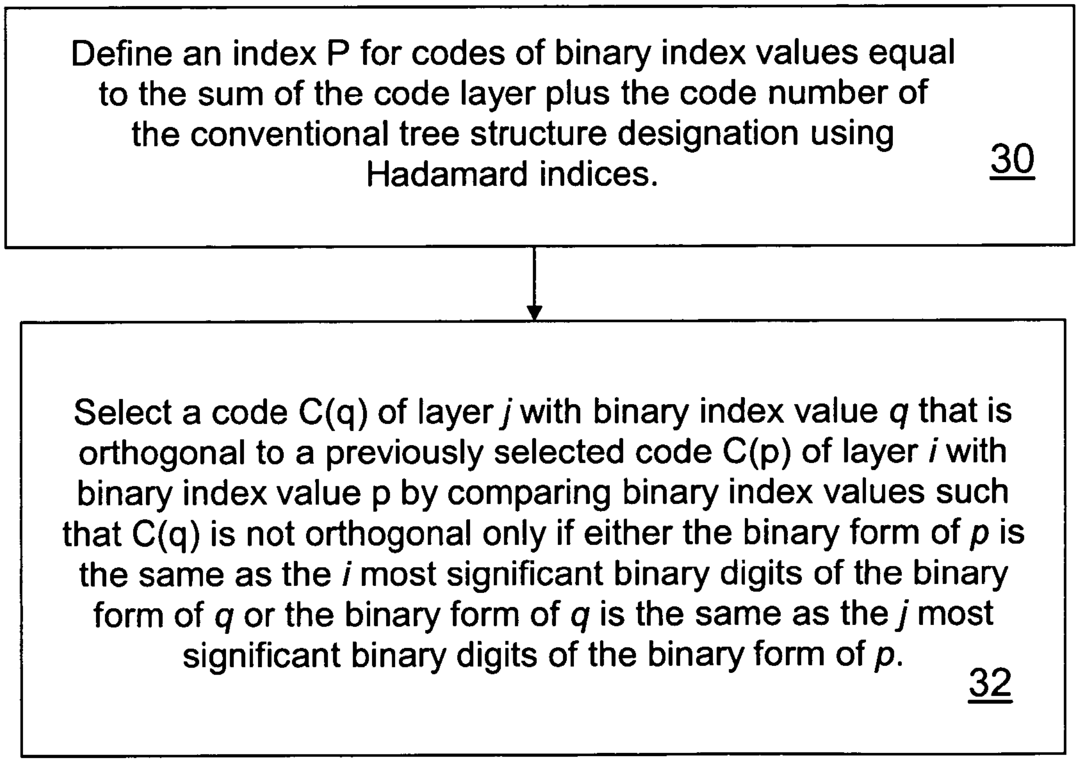
FIG. 5 is diagram of a method in accordance with the teachings or the present invention.

As reflected in FIG. 5, with the new indexing, the available code with the specific spreading factor are generated directly with a processor in a straightforward way from the binary form of the indices of the assigned code without requiring the use of look-up tables.

For instance, if the code represented by 89 (or 1011001) is assigned, its mother codes and descendent codes cannot be assigned for the use simultaneously to maintain relative orthogonality of used codes. Those codes would normally be marked "BUSY" when code 89 is used. The BUSY codes are easily generated because mother codes of code#89 are code#70 (101100), code#22 (10110), code#11 (1011), code#5 (101), code#2 (10), code#1 (1), and its descendent codes, in a nine layer system, are code#178 (10110010), code#179 (10110011), code#356 (101100100), code#357 (101100101), code#358 (101100110), code#359 (101100111) according to properties 2 and 3.

In general, each code index has a binary form which is represented by a sequence of significant binary digits of a length equal to the layer of the Walsh code it represents. To determine the relative orthogonality of one Walsh code of layer i, represented by index value p, with another Walsh code of layer j, represented by an index value q, the binary forms of p and q are compared. Since the binary form of p is a sequence of i significant binary digits and the binary form of q is a sequence of j significant binary digits, the represented Walsh codes are not orthogonal only if either the binary form of p is the same as the i most significant binary digits of the binary form of q or the binary form of q is the same as the j most significant binary digits of p as reflected in step 32 of FIG. 5. For p=87, this condition is true only for q=1, 2, 5, 11, 22, 70, 178, 178, 356, 357, 358 or 359 in a nine layer system as referenced above.

3) Easy to Spread with the Long Code

The spread sequence with a long code can be obtained by the multiple spreading with shorter spreading factors. The short spreading code numbers are directly extracted from the long code number.

For example, the spreading code $c(a_0,a_1 \ldots ,a_M)$ is the Kronecker product of $c(a_0,a_1, \ldots ,a_N)$ and $c(a_0,a_{N+1}, a_{N+2}, \ldots ,a_M)$ with $N \leqq M$. Hence, the long spreading can be obtained by two consecutive spreadings, first with $c(a_0,a_{N+1},a_{N+2}, \ldots a_M)$ and then with $c(a_0,a_1, \ldots ,a_N)$.

4) Easy to Generate the Long Code

The long code $c(a_0,a_1, \ldots ,a_M)$ can be obtained by spreading $c(a_0,a_1 \ldots ,a_N)$ with $c(a_0,a_{N+1} ,a_{N+2} \ldots ,a_M)$. There is no additional hardware complexity in generating the long code from the shorter code.

For example, with references to FIG. 2:

$$c(1110)=c(11) \otimes c(110) \quad \text{Equation (6)}$$

since, $$[1,-1,-1,1,1,-1,-1,1]=[1,-1] \otimes [1,-1,1,-1] \quad \text{Equation (7)}$$

Also:

$$c(1110)=c(111) \otimes c(10) \quad \text{Equation (8)}$$

since, $$[1,-1,-1,1,1,-1,-1,1]=[1,-1,-1,1] \otimes [1,1] \quad \text{Equation (9)}$$

In general, any Walsh code of layer i, represented by an index value p, can be generated by the Kronecker product of two Walsh codes of layers j and k represented by respective index values of q and r where j+k=i. In such case the binary form of p is equal to the binary form of q concatenated with the binary form of $(r-2^k)$.

5) Reduced Memory Size for Code Table

The whole spreading code set does not have to be tabulated in the memory. The above multi-stage spreading scheme needs a much smaller table supporting a lower spreading factor. In addition, there is no need to store the look-up table for the mother codes and descendent codes of all codes. They can be generated in a straight forward manner. For example, a 256 length OVSF code of layer 8 can be generated by two 16 length OVSF codes of layer 4. Hence a code table supporting codes up through layer 4 for a 16 SF is enough to support the easy generation of all codes through layer 8 for a 256 SF. Alternatively, all spreading codes can be generated using the layer two codes c(10) and c(11) per equation 4 above where c(10)=C(2)=[1,1] and c(11)=C(3)=[1,−1].

6) Enable Easy and Fast Dynamic Channel Assignment (DCA)

The indexing of the present invention benefits the dynamic code assignment for easy and fast generation of AVAILABLE and BUSY code lists. In conventional indexing methods, look-up tables are required to store and search through all the mother codes and descendent codes of all codes. Conventionally, the look-up tables take up large amounts of memory and the searching process is time-consuming.

With the new indexing method, there is no need for look-up tables. All the mother codes and descendent codes can be obtained directly in a straightforward manner from the assigned codes. This enables a easy and fast dynamic code assignment.

Moreover, only a list of the index values of used codes need be maintained to determine whether an orthogonal code is available and to select such an orthogonal code. Where a code of spreading factor SF is needed and prior used codes indexes $p_1 \ldots p_n$ have been stored to a used code list, each value p from SF through 2SF-1 can be compared against the stored used code index values to determine the availability of an orthogonal code.

For simplicity, p can be first set equal to SF and the binary form of p can be compared to the binary form of each of the stored used code index values to determine orthogonality as set forth above. If a comparison yields a determination of non-orthogonality, the comparison process can be stopped, p incremented by 1 and the comparison process repeated with the incremented p. The process continues until a p is found which represents a code orthogonal to all the used codes or until p is incremented to equal 2SF. In the first case, the code corresponding top is selected for use as an orthogonal code and p is stored to the set of used codes. In the second case where p is incremented to equal 2SF, no orthogonal code is available.

The new code index method is a method for assigning single number that indicates the layer number and the code number, and moreover it indicates the structure of the code and the information about the orthogonality to other codes.

What is claimed is:

1. A communication station configured for use in a communications system where codes are selected from a predetermined set of codes that have selected characteristics relative to each other, the communication station comprising:

- a processor and associated memory device for selecting codes from the set of predetermined codes;
- said memory device having an index of consecutive positive integer index values that have a binary form of significant bits where each index value represents one of the predetermined codes; and
- said processor configured to select a second code that has a selected different characteristic than a previously selected first code such that the binary form of the index value of the first code is not the same as the most significant bits of the binary form of the index value of the second code and the binary form of the index value of the second code is not the same as the most significant bits of the binary form of the index value of the first code.

2. The communication station according to claim 1 wherein the processor is configured to select a second code by:

- first indicating as busy the index value of the previously selected first code and the index values of all other codes where the index value of the first code is the same as the most significant bits of the binary form of the index value of the other code or the binary form of the index value of the other code is the same as the most significant bits of the binary form of the index value of the first code, and
- then selecting a code having an index value that is not indicated as busy as the second code.

3. The communication station according to claim 1 where the codes are orthogonal variable spreading factor (OVSF) codes selected from a set of Walsh codes represented as a binary tree having multiple layers such that a zeroth layer has one Walsh code and each successive layer has twice the number of Walsh codes as the layer it succeeds wherein said processor is configured to select a second code that is selectively different than a previously selected first code such that the second code is an OVSF code that is orthogonal to the previously selected first code.

4. The communication station according to claim 3 wherein the processor is configured to select a second code by:

- first indicating as busy the index value of the previously selected first code and the index values of all other codes where the index value of the first code is the same as the most significant bits of the binary form of the index value of the other code or the binary form of the index value of the other code is the same as the most significant bits of the binary form of the index value of the first code, and
- then selecting a code having an index value that is not indicated as busy as the second code.

5. The communication station according to claim 3 wherein said processor is configured to determine the relative orthogonality of a selected OVSF code represented by a first index value with another OVSF code represented by a second index value by comparing the binary forms of the first and second index values.

6. The communication station of claim 5 wherein said memory device is configure to store the binary forms of the index values of the OVSF codes as a sequence of significant binary digits and wherein said processor is configured to determine OVSF codes to be not orthogonal if either the binary form of the index value of one code is the same as the most significant binary digits of the binary form of the index value of another code or the binary form of the index value of the another code is the same as the most significant binary digits of the binary form of the index value of the one code.

7. The communication station of claim 1 wherein said processor is configured to generate codes based upon a sequence of significant binary digits representing the binary form of the codes index value.

8. The communication station of claim 7 wherein said processor is configured to generate codes as the Kronecker Product of codes represented by index values 2 and 3 correspondingly to a sequence of significant binary digits of the binary form of its index value where each binary digit 0 corresponds to the code of index value 2 and each binary digit 1 corresponds to the code of index value 3.

9. The communication station according to claim 1 wherein said communication station is a User Equipment.

10. The communication station according to claim 1 wherein said communication station is a Node B.

11. A method of selecting codes from a predetermined set of codes that have selected characteristics relative to each other comprising:

- defining an index of consecutive positive integer index values that have a binary form of significant bits where each index value represents one of the predetermined codes; and
- selecting a second code that has a selected different characteristic than a previously selected first code such that the binary form of the index value of the first code is not the same as the most significant bits of the binary form of the index value of the second code and the binary form of the index value of the second code is not the same as the most significant bits of the binary form of the index value of the first code.

12. The method according to claim 11 wherein the second code is selected by:

- first indicating as busy the index value of the previously selected first code and the index values of all other codes where the index value of the first code is the same as the most significant bits of the binary form of the index value of the other code or the binary form of the index value of the other code is the same as the most significant bits of the binary form of the index value of the first code, and then selecting a code having an index value that is not indicated as busy as the second code.

13. The method according to claim 11 where the codes are orthogonal variable spreading factor (OVSF) codes selected from a set of Walsh codes represented as a binary tree having multiple layers such that a zeroth layer has one Walsh code and each successive layer has twice the number of Walsh codes as the layer it succeeds wherein a second code is selected that is selectively different than a previously selected first code such that the second code is an OVSF code that is orthogonal to the previously selected first code.

14. The method according to claim 13 wherein the second code is selected by:

first indicating as busy the index value of the previously selected first code and the index values of all other codes where the index value of the first code is the same as the most significant bits of the binary form of the index value of the other code or the binary form of the index value of the other code is the same as the most significant bits of the binary form of the index value of the first code, and then selecting a code having an index value that is not indicated as busy as the second code.

15. The method according to claim 13 wherein the relative orthogonality of a selected OVSF code represented by a first index value is determined with respect to another OVSF code represented by a second index value by comparing the binary forms of the first and second index values.

16. The method of claim 15 wherein the binary forms of the index values of the OVSF codes are stored in a memory as a sequence of significant binary digits and wherein OVSF codes are determined to be not orthogonal if either the binary form of the index value of one code is the same as the most significant binary digits of the binary form of the index value of another code or the binary form of the index value of the another code is the same as the most significant binary digits of the binary form of the index value of the one code.

17. The method of claim 11 wherein a processor is used to generate codes based upon a sequence of significant binary digits representing the binary form of the codes index value.

18. The method of claim 17 wherein said processor generates codes as the Kronecker Product of codes represented by index values 2 and 3 correspondingly to a sequence of significant binary digits of the binary form of its index value where each binary digit 0 corresponds to the code of index value 2 and each binary digit 1 corresponds to the code of index value 3.

* * * * *

UNITED STATES PATENT AND TRADEMARK OFFICE

CERTIFICATE OF CORRECTION

PATENT NO. : 7,239,604 B2
APPLICATION NO. : 10/831254
DATED : July 3, 2007
INVENTOR(S) : Kim et al.

It is certified that error appears in the above-identified patent and that said Letters Patent is hereby corrected as shown below:

TITLE PAGE

Item (56), U.S. PATENT DOCUMENTS, page 1, right column, line 4, after "6,163,524 A 12/2000", delete "Mognusson et al." and insert therefor --Magnusson et al.--.

Item (56), OTHER PUBLICATIONS, page 2, right column, line 12, after the words "Binary Group", delete "Coeds" and insert therefor --Codes--.

IN THE DRAWINGS

At Figure 1, delete Title, "Figure 1" and insert therefor --Figure 1 (Prior Art)--.

At Figure 3, inside UE box, make the 5 boxed items read --UE--.

IN THE SPECIFICATION

At column 1, line 17, after the word "relates", insert --to--.

At column 2, line 67, after the word "teachings", delete "or" and insert therefor --of--.

At column 3, line 37, before the word "systems", delete "indice" and insert therefor --index--.

At column 3, line 38, before the word "systems", delete "indice" and insert therefor --index--.

At column 3, line 39, before the word "systems", delete "indice" and insert therefor --index--.

At column 4, line 49, between "FIG.2" and "FIG. 4", insert --and--.

At column 5, line 61, delete the second instance of "178" and insert therefor --179--.

At column 6, line 60, after the word "enables", delete "a" and insert therefor --an--.

At column 7, line 12, after the word "corresponding", delete "top" and insert therefor --to p--.

At column 7, line 17, before the word "single", insert --a--.

UNITED STATES PATENT AND TRADEMARK OFFICE

CERTIFICATE OF CORRECTION

PATENT NO. : 7,239,604 B2
APPLICATION NO. : 10/831254
DATED : July 3, 2007
INVENTOR(S) : Kim et al.

It is certified that error appears in the above-identified patent and that said Letters Patent is hereby corrected as shown below:

IN THE CLAIMS

At claim 7, column 8, line 30, before the word “index”, delete “codes” and insert therefor --code’s--.

At claim 17, column 10, line 15, before the word “index”, delete “codes” and insert therefor --code’s--.

Signed and Sealed this

Eighteenth Day of December, 2007

JON W. DUDAS
*Director of the United States Patent and Trademark Office*